Figures 13, 14:
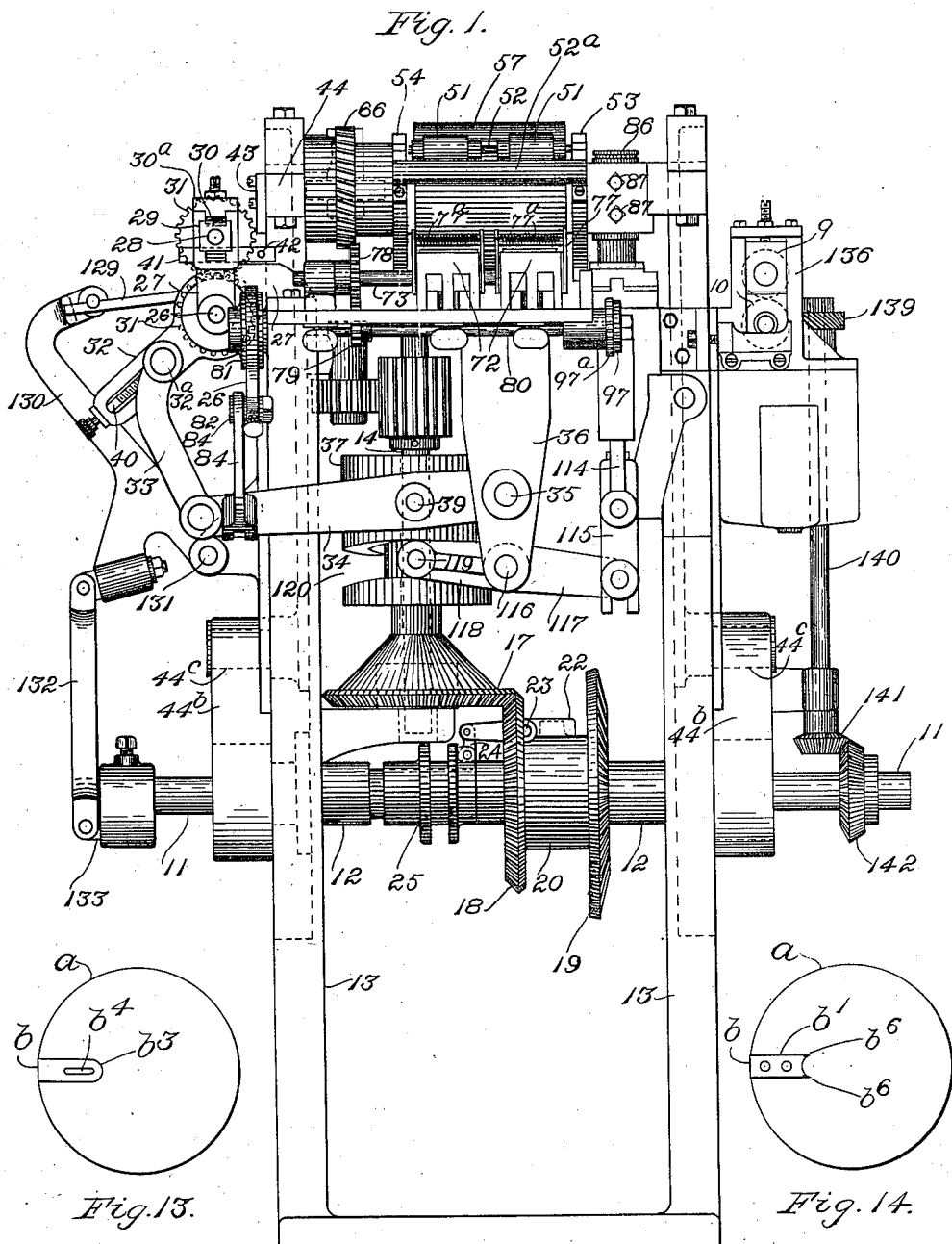

F. K. PLYMPTON.
MACHINE FOR MAKING CLOSURE DISKS OR CAPS.
APPLICATION FILED AUG. 30, 1911.

1,172,830.

Patented Feb. 22, 1916.
6 SHEETS—SHEET 1.

Witnesses:
Oscar F. Hill
Edith A. Wiseman

Inventor:
Frederic K. Plympton
by Chas. F. Randall
Attorney.

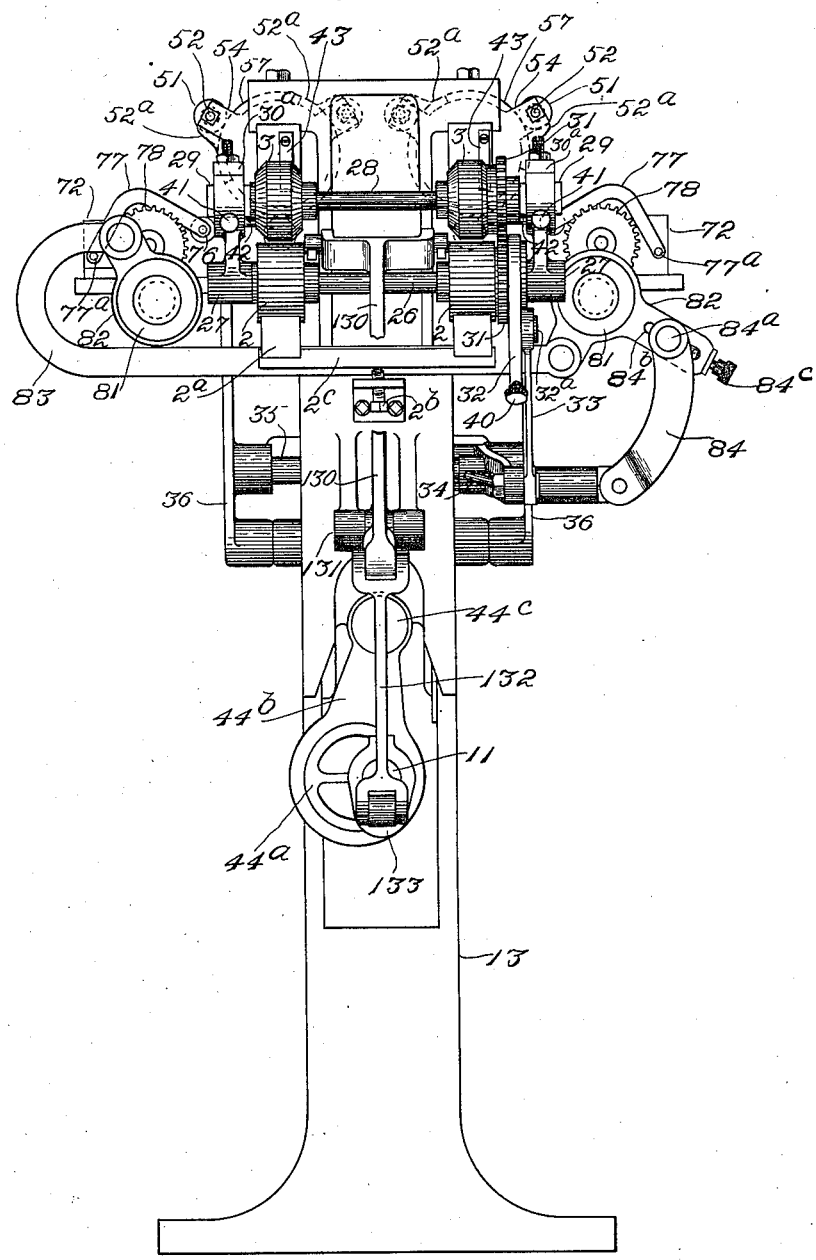

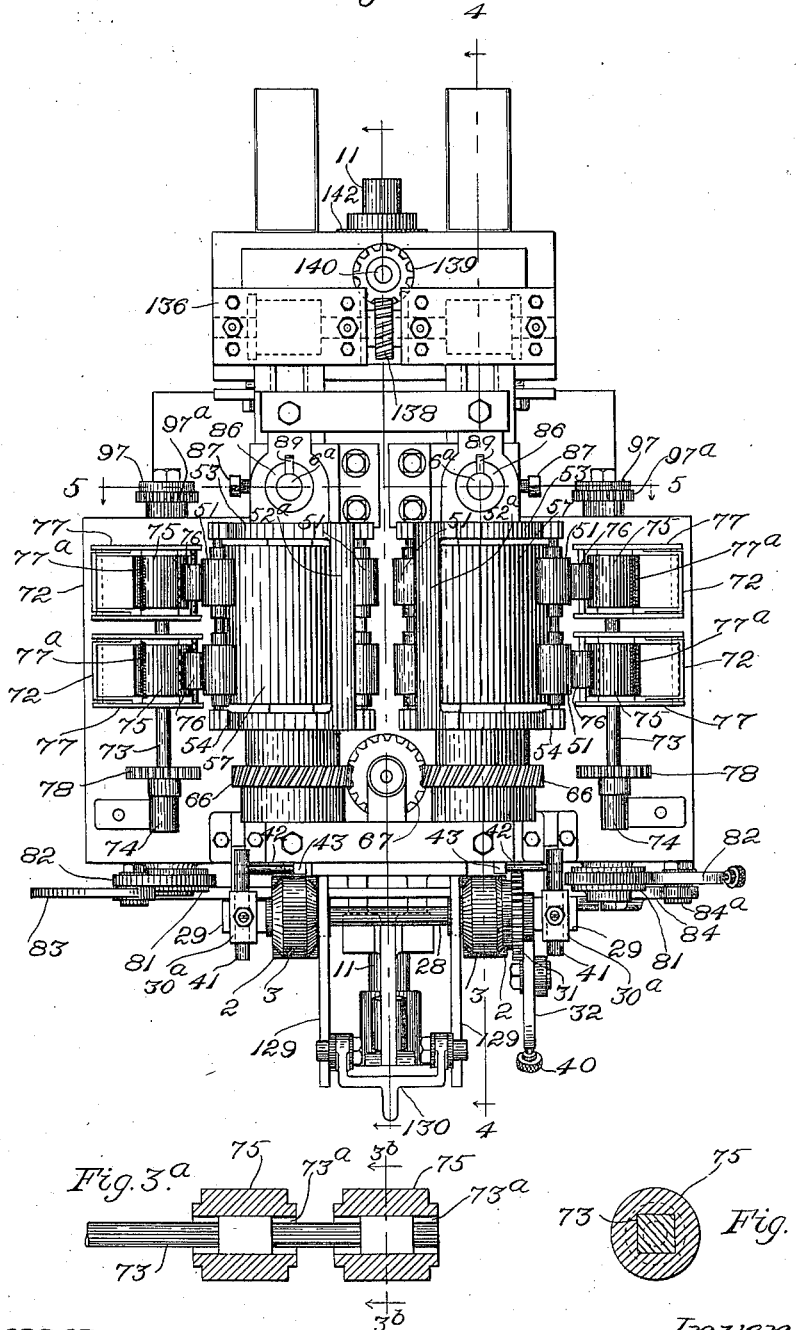

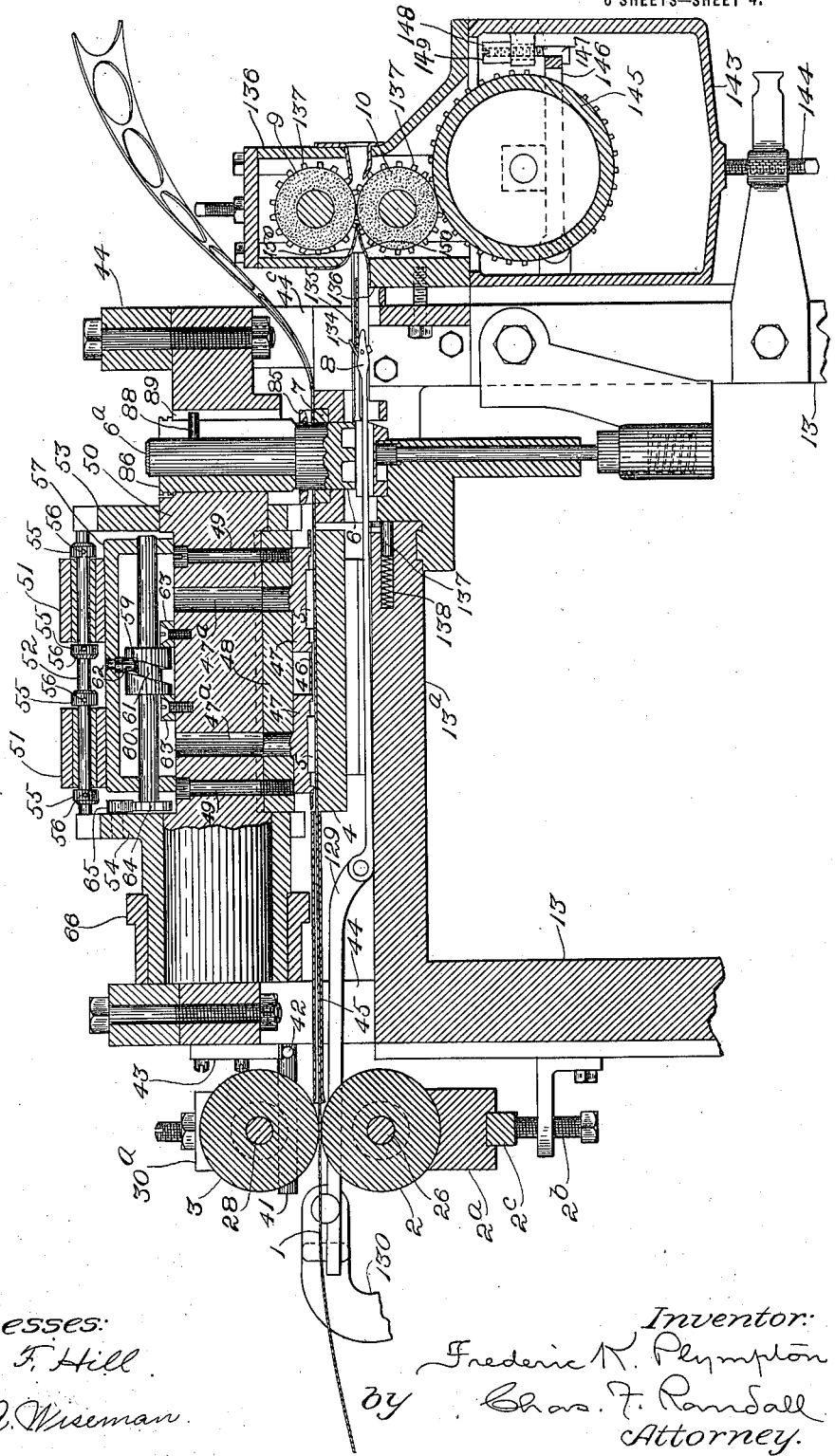

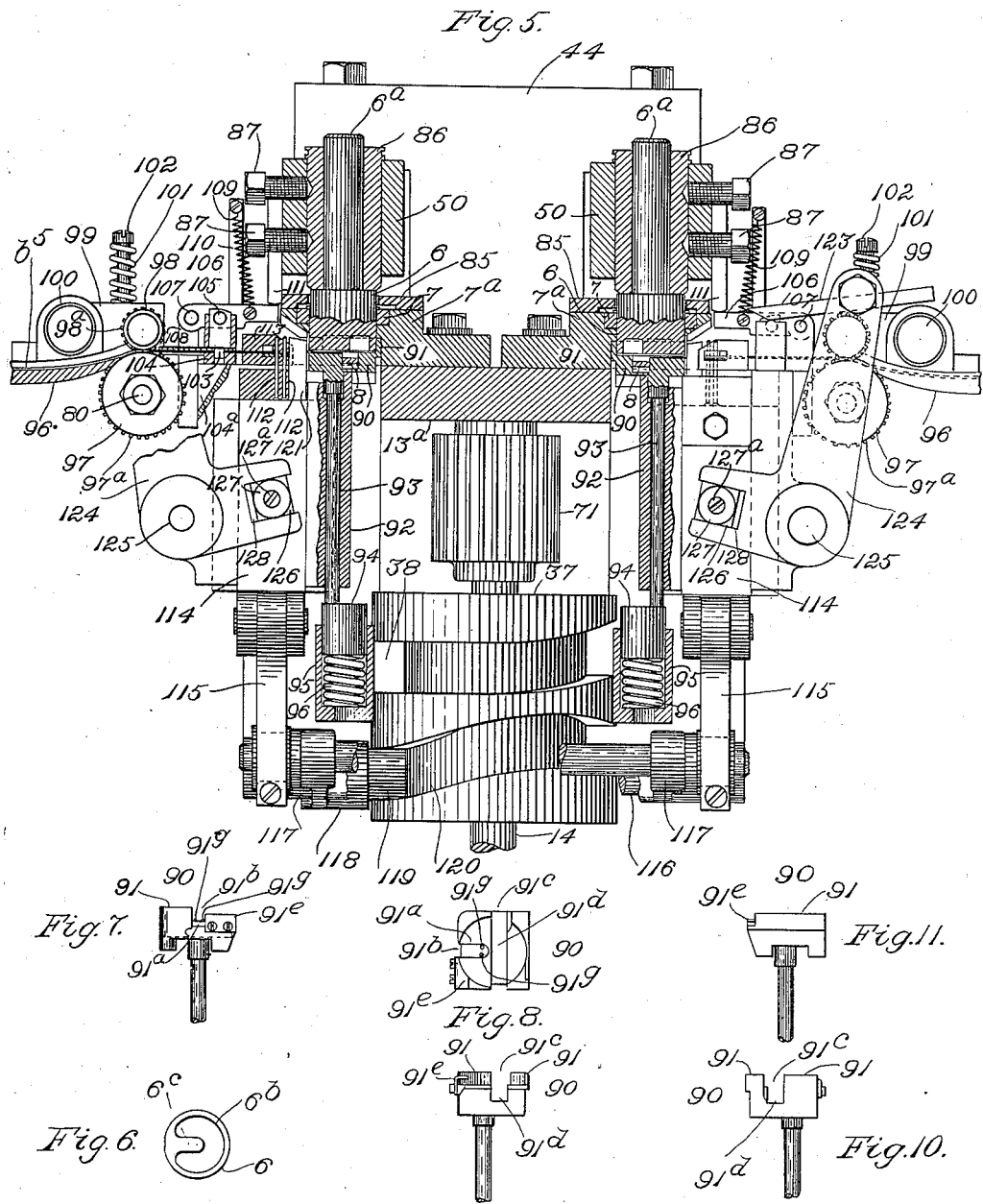

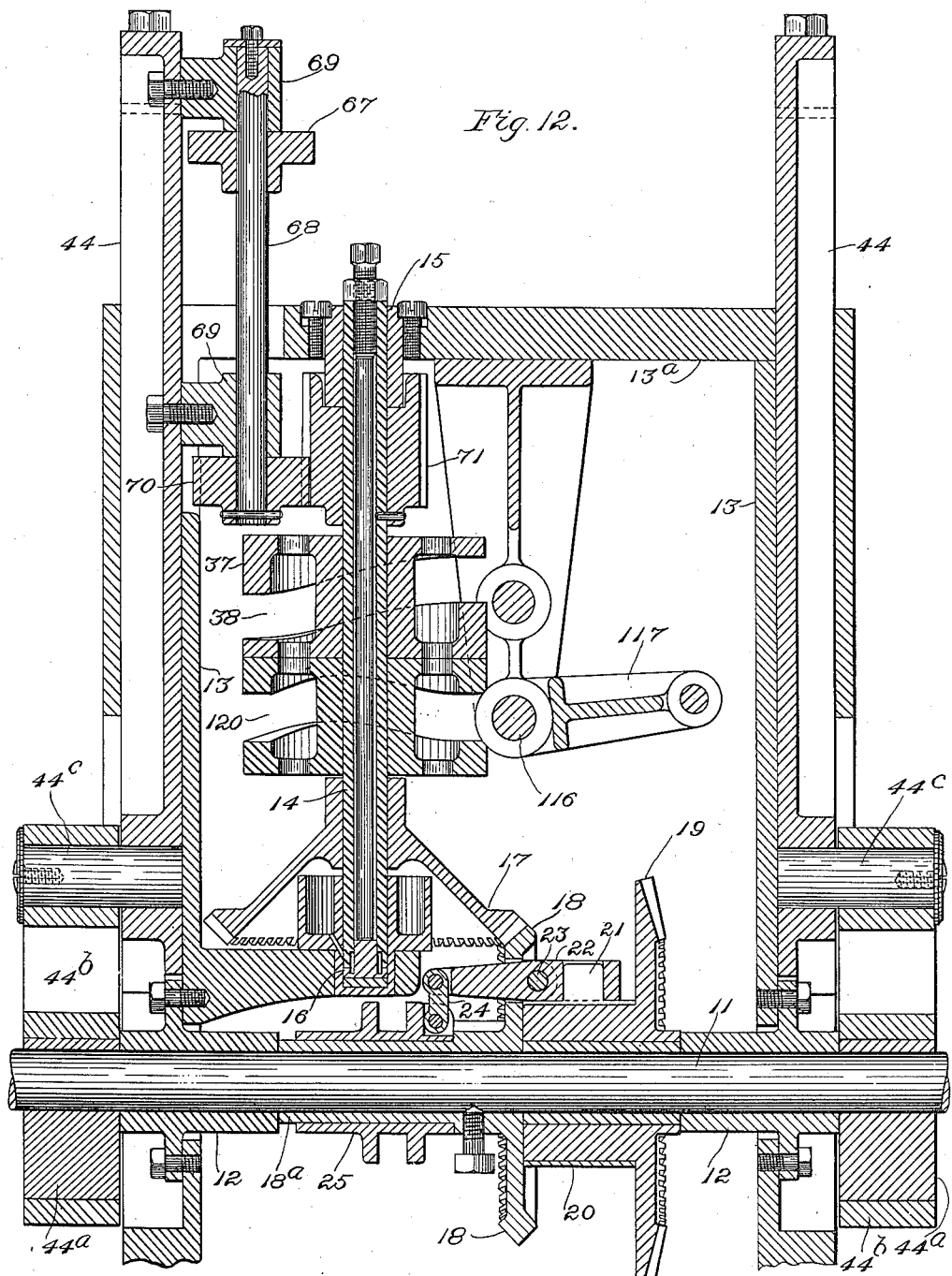

UNITED STATES PATENT OFFICE.

FREDERIC K. PLYMPTON, OF WELLESLEY, MASSACHUSETTS, ASSIGNOR TO PLYMPTON MANUFACTURING COMPANY, OF BOSTON, MASSACHUSETTS, A CORPORATION OF MASSACHUSETTS.

MACHINE FOR MAKING CLOSURE DISKS OR CAPS.

1,172,830.   Specification of Letters Patent.   Patented Feb. 22, 1916.

Application filed August 30, 1911. Serial No. 646,922.

*To all whom it may concern:*

Be it known that I, FREDERIC K. PLYMPTON, a citizen of the United States, residing at Wellesley, in the county of Norfolk, State of Massachusetts, have invented a certain new and useful Improvement in Machines for Making Closure Disks or Caps, of which the following is a specification, reference being had therein to the accompanying drawings.

The invention resides in mechanism primarily designed for use in manufacturing closure-disks or caps having extractor-attachments in strip-form fastened thereto. Such mechanism is intended to be employed also in the manufacture of other articles embodying the same principles of construction. The mechanism may be varied in specific character more or less according as that of the attachments it is desired to produce and apply, and that of the disks or caps, etc., to which such attachments are applied, may vary. Some of the extractor-attachments that have been proposed heretofore lie wholly upon the upper surface of a disk or cap. Others fit around the edge of a disk or cap, with portions at both surfaces of the latter. One form of the variety last mentioned is shown and described in United States Letters Patent for improvements in closures for milk jars and the like, No. 886,014, dated April 28, 1908. This form has gone into practical use. The extractor-attachment has, in various instances, been engaged with the disk or cap by one or more burs or spurs integral with the attachment and driven into the material of the disk or cap. Other modes of connection have been proposed.

The more general principles of the invention are applicable in various forms to machines adapted for the manufacture of closure-disks or caps, and other articles, having attachments varying in respect of the foregoing details.

The invention, in its more specific phase, comprises mechanism adapted, in particular, for the production of closure-disks or caps and other articles having applied thereto attachments of a construction similar to that of the extractor-attachments of Letters Patent No. 886,014 aforesaid. That is to say, in this phase of the invention, the latter comprises means for combining with a closure-disk or cap, or other required article of stock in sheet-form, which need not be a closure, as, for instance, a shipping or price tag, a metal strip of U-shape which clasps the disk or cap, or other article, from the edge thereof inward and is secured by one or more burs or spurs struck up therefrom and clenched in the material of the article.

The invention comprises, also, various combinations in which such means, devices for cutting or punching the article from a strip or web, printing or embossing devices, with or without devices for applying paraffin or otherwise treating the article, and devices for feeding the stock into a machine, and feeding the article along, appear as elements.

The drawings show the invention embodied in a machine for making closure-disks or caps, and for convenience the invention will be described with more particular reference to its employment in the said machine for such purpose. The machine shown is a double-header, it being furnished with two sets of mechanisms for forming caps and extractors, combining them etc., some of the constructional and working parts being in duplicate, and two strips of cap-stock being fed into the machine and two sets of operations being carried on simultaneously therein, although the entire machine is actuated by one set of driving connections, and certain elements serve for both sets of the working parts in common.

Figure 15:
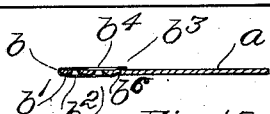

In the drawings:—Figure 1 is a side elevation of the general machine, the means for applying the attachments being omitted. Fig. 2, Sheet 2, is an end elevation of the end of the machine at which the strips of cap-stock enter the latter, the actuating lever for the pusher or transferrer being partly broken away. Fig. 3, Sheet 3, is a plan of the machine, the means for applying the attachments being omitted. Figs. 3ª and 3ᵇ are detail sectional views of two of the inking rolls and their actuating shaft. Fig. 4, Sheet 4, is a view showing on an enlarged scale certain portions of the machine in section in the plane of line 4, 4, Fig. 3. Fig. 5, Sheet 5, is a view showing on the same scale as Fig. 4 certain portions of the machine in section in the plane of line 5, 5, Fig. 3. Fig. 6, Sheet 5, shows the bottom of the punch. Figs. 7, 8, 9, 10, and 11, Sheet 5, are views of the machine-element which coöperates with the punch in setting and clenching the extractor-attachment. Fig. 12, Sheet 6, is a sectional view on an enlarged scale showing chiefly actuating and motion-transmitting mechanisms. Figs. 13, 14, and 15, Sheet 1, are respectively a top view, a bottom view, and a view in section, of a closure-disk with extractor-attachment, such as the particular machine herein illustrated is adapted to produce.

Having reference to the drawings:—the closure-disk or cap shown in Figs. 13, 14 and 15 of Sheet 1 comprises a disk $a$ and an extractor-attachment $b$. The disk is composed of paper-stock, and the said attachment consists of a strip of sheet-metal bent into U-shape and clasping the edge of the disk, the limbs of the attachment extending inward toward the center of the disk. The limb $b^1$ at the underside of the disk has burs $b^2$, $b^2$, which are struck up therefrom and entered into the material of the disk from the under side of the latter, and clenched in such material. Thereby the attachment is connected securely with the disk. The other limb, $b^3$, simply rests upon the upper surface of the disk, so that such limb may be lifted to serve as a handle in pulling the closure-disk or cap from the mouth of a bottle or other receptacle sealed therewith. A hole $b^4$ in limb $b^3$ enables one's fingers to hold better in pulling upon such limb, or may receive the point of some implement used for withdrawing the closure-disk or cap.

A strip 1 of cap-stock (Fig. 4) is supplied to each set of devices in the machine. Each set includes (as shown to best advantage in Fig. 4) feed-rolls, 2, 3, a printing-bed 4, printing-plates 5, 5, a disk-cutting punch 6, a die 7 coöperating with said punch in cutting out disks, attachment-applying devices, a pusher or transferrer 8, and paraffining-rolls 9, 10. The strip 1 is advanced by the feed-rolls and imprinted by the printing-devices, disks bearing the imprints are punched successively from the strip, an attachment applied to each disk, and the latter is transferred to the paraffining rolls and by them treated with paraffin and delivered.

To bring about the operations just set forth, the working parts of the machine are actuated through connections with a main shaft 11, Figs. 1, 2, 3 and 12. The said shaft extends transversely of the machine and is mounted in stationary bearings 12, 12, Figs. 1 and 12, in connection with the machine-frame 13. Some of the movements of the working parts are derived directly therefrom. Others are taken from an upright cam-shaft 14, Figs. 1, 5 and 12, mounted in a stationary bolster-bearing 15, Fig. 12, and stationary step-bearing 16, both of the said bearings being supported by fixed portions of the machine-frame, and such cam-shaft being in driving-connection with the main shaft through bevel gear-wheels 17, 18, Figs. 1 and 12, the former fixed on the cam-shaft and the other on the main shaft. By means of such bevel gear-wheels the cam-shaft is driven from the main shaft. A convenient arrangement is shown for driving the main-shaft, and starting and stopping the machine as required. It comprises a wheel 19, mounted concentrically with the main shaft and driven continuously through suitable power-connections which are not shown, and means for clutching said wheel to the main shaft and unclutching it therefrom, both at will. The clutching and unclutching means is of well-known character. It may be described briefly as comprising a friction-band 20 surrounding the hub of wheel 19, as shown best in Fig. 12, with its ends brought close together, such ends being provided with outstanding lugs 21, only one of which is shown, a lever 22 pivoted at 23 upon gear 18 extending through a slot in such gear, and having in one arm thereof a slot which receives and fits both of the lugs 21, a link 24 connected pivotally at one end thereof to the said lever, and a grooved hub 25 having the other end of such link connected pivotally thereto, said hub being sleeved upon a sleeve $18^a$ in connection with the gear 18 and surrounding shaft 11. A shifter-fork, not shown, is employed in practice for moving hub 25 lengthwise of the main shaft. Movement of the hub toward the right in Figs. 1 and 12 upon the exterior of the sleeve $18^a$ to its position shown in Fig. 12, will transmit movement to lever 22, and turn it upon pivot 23 in the direction to swing its slotted arm inward toward the main shaft, thereby wedging the lugs 21 toward each other and contracting the friction-band 20 so as to grip the hub of wheel 19. This will cause driving-power to be transmitted from the wheel 19 through the band 20 and the lever 22 to the gear 18 and the shafts 11 and 15 so as to drive the machine. Movement of the hub 25 in the other direction, i. e., to the left, from its position in Fig. 12, will act through link 24 to turn the lever 22 upon pivot 23 so as to swing the slotted arm thereof outward, thereby allowing lugs 21 to separate, and permitting the friction-band to expand. This will reduce or terminate the frictional hold of the said band upon the hub of wheel 19, so that the machine will stop. This driving arrangement forms no part of the invention, and any satisfactory substitute arrangement may be employed instead, if deemed desirable.

Referring now to the devices for feeding the strips of cap-stock, the lower feed-rolls 2, 2, of both sets of devices are fixed upon a shaft 26, Figs. 1, 2, 4, extending across the machine and mounted in bearings in brackets 27, 27, projecting from the machine-frame. The upper feed-rolls 3, 3, of both sets of devices are fixed upon a shaft 28, Figs. 1 to 4, extending across the machine and journaled in boxes 29, 29, that are movable in said brackets, the said boxes being acted upon by springs 30, Fig. 1, confined between the tops of the boxes and the cap-pieces 30ª, 30ª, and tending to press rolls 3, 3, toward rolls 2, 2. The two shafts 26, 28 are geared together by spur-gears 31, 31, to insure that the upper rolls shall rotate in unison with the lower ones. An intermittent movement of rotation is communicated to the feed-rolls by means of a vibrating clutch-arm 32, Figs. 1, 2, 3, mounted to swing concentrically with the roll-shaft 26, intermittent-clutch devices of any approved character intermediate the roll-shaft 26 and said clutch-arm 32, and means for vibrating the said clutch-arm, such means comprising a link 33 having one end thereof engaged with a pivot 32ª carried by said arm, a lever 34 having the other end of said link connected pivotally therewith, said lever being fixed upon a rockshaft 35 which is mounted in bearings in fixed brackets 36, 36, and a grooved cam-hub 37 fixed on the upright cam-shaft 15. The groove 38, Figs. 5 and 12, of the said cam-hub receives a roll mounted upon a pin 39, Fig. 1, carried by the said lever. The pivot 32ª serving as the means of connection between link 33 and clutch-arm 32 is adjustable lengthwise of the clutch-arm toward and from the axes of feed-roll shaft 26 to regulate the extent to which the feed-rolls are rotated and the cap-stock advanced at each feed-movement. 40 is an adjusting-screw for facilitating the adjustment of the pivot along the arm. Each feed-movement is proportioned to advance the cap-stock a distance slightly greater than the diameter of a closure-disk or cap, in order that a small portion of the strip may be left between successive holes from which caps have been punched. To prevent the feed-rolls from over-running through momentum, each roll 2 has combined therewith a friction block 2ª, Figs. 2 and 4, having a concave face which is kept pressed against the periphery of the roll by means of a screw 2ᵇ acting against a cross-bar 2ᶜ that engages with both of the concave blocks. This particular cap-stock feed-mechanism is not essential, and the same may be replaced in practice by feed-mechanism of other approved character adapted to meet the requirements.

To remedy the tendency of a continuous strip of material passing between a pair of feed-rolls to drift or swerve edgewise, the feed-rolls 2, 3, have combined with them, in practice, devices for separating them at intervals to release the strip of cap-stock momentarily from the grip or hold of such rolls. Devices for such purpose are shown, described, and claimed in United States Patent No. 1,019,295, granted March 5, 1912, for improvements in strip-feeding mechanism. The present drawings show the elements of such devices, namely the cam-rockers 41, 41, arranged to engage with the boxes 29, 29, for the upper feed-roll shaft 28, the pins 42, 42, respectively projecting from the respective cam-rockers, and the strikers 43, 43, carried by the upper end of the adjacent vertically-reciprocating slide 44. In the case of these devices, each time the descent of the slide 44 carries the strikers 43, 43, against the pins 42, 42, the cam-rockers are thereby rocked so that they lift the boxes 29, 29, and thereby separate the feed-rolls sufficiently to release the grip or hold of the feed-rolls upon the strip of cap-stock and afford the strip opportunity to recover its normal path.

The strip 1 is conducted from the feed-rolls 2, 3, to the printing devices by guides 45, Fig. 4, of convenient character. The strip travels across the upper surface of the printing-bed 4, and in thus traveling is held from upward displacement by hold-down guides 46 shown in section in Fig. 4.

The printing-plates 5, 5, Fig. 4, are attached to plate-holding blocks 47, 47, having plugs or pins which enter into holes in a carrier-plate 48. The blocks 47, 47, are detachably secured to the said carrier-plate, as by means of clamping-screws (not shown) provided in connection with the carrier-plate and engaging the said plugs or pins. The carrier-plate is attached by screws 49, 49, to the head 50. There are two heads 50, 50, one for each set of devices, both heads being carried by the two slides 44, 44, at the front and rear, respectively, of the machine. The said slides are mounted in guideways in connection with the machine-frame, in which they are moved vertically up and down through the action of eccentrics 44ª, 44ª, Figs. 1, 2, 12, on main shaft 11, and eccentric-straps 44ᵇ, 44ᵇ, engaging with pins 44ᶜ, 44ᶜ, projecting from the slides. The up and down movements of the said slides and head produce the required printing action. The illustrated machine contains in each set of devices two printing-plates arranged in line, so as to act successively upon a given portion of strip as the latter is advanced step by step. The distance between the centers of the printing-plates corresponds with the length of two feed-movements of the cap-stock, so that each portion of the latter intended to be formed into a disk or cap will be presented first in position under one printing-plate and afterward under the other. For single-color work only one printing-plate may be used, unless it is desired to utilize printing-surfaces on two printing-plates. The provisions for the employment of two printing-plates, to act successively upon the same portion of the cap-stock, are particularly useful for printing disks or caps with dates, as for the days of a month, inasmuch as the main portions of the matter to appear upon the disks or caps may be carried by one printing-plate, which will not require to be changed, and the dates may be carried by separate plates, which may be separately introduced into the machine and changed from time to time. Such provisions are also particularly useful for two color work. Of course the machine may be built to employ more than two printing-plates to act in succession upon the cap-stock. Other printing devices may be substituted. For instance, a revoluble type-wheel or carrier may be employed for dating purposes, or to enable one printing surface to be substituted in action for another with convenience. The holes into which the plugs or pins of blocks 47, 47, are entered (Fig. 4) register with holes 47ª, 47ª, in head 50, extending to the top of the said head. When it is required to remove the blocks a wire or rod may be pushed down into the said holes, to push the plugs or pins out from the latter.

The inking arrangements for the printing devices comprise rolls 51, 51, for inking the printing-plates 5, 5. The said rolls are mounted on rods or arbors 52, 52, Figs. 1 and 4, supported by carrier-wheels 53, 54, which latter are mounted upon cylindrical portions of the head 50, as shown best in Fig. 4. The said carrier-wheels, together with the rods 52, 52, and the cross-ties 52ª, 52ª, joining the carrier-wheels, constitute an ink-roll carrier. The carrier-wheels turn upon the said cylindrical portions of the head, so as to carry the rolls around and cause them to pass under the printing-plates and make contact with the surfaces of the printing-plates. The turning movement of the ink-roll carrier is timed with relation to the vertical reciprocation of the head 50 that the passage of an inking roll beneath and across a printing-plate occurs while the head is in a more or less uplifted position. The roll-supporting rods or arbors 52, 52, extend from one carrier-wheel 53, 54, to the other. The rolls 51, 51, are free to rotate upon the said rods or arbors and are held in place thereon, in proper positions to correspond with the positions of the printing-plates, by means of collars 55, 55, (see more particularly Fig. 4) fixed by means of clamping-screws 56, 56, upon the said rods with capacity for adjustment along the rods as may be necessary. This adjustment enables the inking-rollers to be set so as to correspond properly in position with the positions of the printing-surfaces of the printing-plates, so that ink may be supplied properly to such surfaces. A nearly cylindrical ink-plate 57, Figs. 1 to 4, having a vertical opening or slot in its under portion, sits saddlewise upon the head 50 between the carrier-wheels 53, 54. By reason of the ink-plate and ink-roll carrier both being mounted upon the head 50, they partake of the up and down movements of said head in common with the printing-plates and their carriers. Consequently the inking devices always remain in unchanged working relation with respect to the printing-plates, notwithstanding the vertical reciprocating movements of the latter. In the rotation of the carrier-wheels the ink-rolls roll around the ink-plate upon the ink-charged surface of the latter, so that the surfaces of the said ink-rolls are thereby kept properly charged with ink.

In order to provide for uniform distribution of the ink upon the surfaces of the ink-plate and ink-rolls, so that it shall be applied uniformly to all portions of the printing-plates, the ink-plate 57 has a gradual to and fro longitudinal shift communicated thereto. This shift is produced by means of a hub 59 located within the interior space of the ink-plate, said hub being fixedly connected with a shaft 60 that extends lengthwise of the ink-plate, with its end portions fitted to bearings in the end-walls of the ink-plate. Thereby the hub is supported in proper position. The said hub is formed with an endless peripheral groove 61 extending around the same, first obliquely in one direction partly around the hub, and then obliquely in the reverse direction to the starting point. This groove receives a pin 62 projecting inward from the shell of the ink-plate. The hub is confined endwise between blocks 63, 63, which are fixed by means of screws upon the top of the head 50, between which blocks the hub fits, with the ends of the hub touching the said blocks. Consequently, the hub cannot shift lengthwise. A gradual turning movement is imparted to the hub by means of a ratchet-wheel 64 fixed upon one end of the shaft 60, and a pawl 65 pivoted upon the adjacent carrier-wheel 54. In every revolution of the carrier-wheels the pawl 65, as it passes the ratchet-wheel, engages with the latter and partially turns the same, the shaft 60, and the hub. The engagement of the walls of the cam-groove in the hub with the pin 62 as the hub is rotated produces a gradual lengthwise movement of the ink-plate, first in one direction and then in the other. In this movement, the ink-plate slides upon the head 50 and also upon shaft 60. As the inking-rolls 51, 51, do not partake of the lengthwise movement of the ink-plate, such movement involves a shift of the surface of the ink-plate, lengthwise of the latter, relative to the inking-rolls, and thereby proper distribution of the ink upon the surfaces of the ink-plate and inking-rolls is effected.

The ink-roll carrier is continuously rotated during the operation of the machine through suitable operating mechanism, in this instance constituted by gear-connections with the main shaft 11. Such gearing comprises a helical gear 66 fixedly connected with the hub of the carrier-wheel 54, a helical gear 67 (Figs. 3 and 12) meshing with the carrier-gear 66 and fixed upon the upper end of a short upright shaft 68 (Fig. 12) mounted in bearings 69, 69, carried by the adjacent slide 44, a spur-gear 70 fixed on the lower end of shaft 67, and a spur-gear 71 fixed upon the upper end of the cam-shaft 14, and with which the spur-gear 70 meshes, the said cam-shaft being driven, as already explained, by means of bevel gears 17 and 18 from the main shaft 11. The slide 44 on which the shaft 68 is mounted carries the shaft 68 and its helical gear 67 up and down with it, in order that the said helical gear may remain at all times in mesh with the helical gear 66 of the ink-roll carrier. In this movement of the shaft 68 it takes the lower gear 70 with it, and in order to accommodate the up and down movement of gear 70, which is of ordinary spur-gear form, the gear 71 is an elongated gear, its length being sufficient to enable gear 70 to remain in mesh therewith in all positions of the slides and printing devices. The driving helical gear 67 is located between the helical gears 66, 66, of the ink-roll carriers of both sets of devices in the machine, as shown in Fig. 3, and is in driving mesh with both thereof, so that the one gear 67 and its driving train serve for the actuation of both ink-roll carriers.

Fresh ink is supplied to the ink-rolls and ink-plates from fountains 72, 72, mounted upon the machine frame at the sides thereof, by means of ink-feeding rolls 75, 75, which are journaled at their ends in bearings in the side walls of the fountains. As shown best in Figs. 1 and 3, there are at each side of the machine two fountains, each with its feeding roll 75 working within the fountain. The feeding rolls 75, 75, are slowly turned so as to cause them to take up supplies of ink upon their surfaces and present such supplies for transfer to the inking plates. The turning is effected by means of a shaft 73 and devices for gradually turning the latter. The rolls are combined with the shaft 73 by each thereof being formed with a central longitudinal opening 73ª therethrough, Figs. 3ª and 3ᵇ, Sheet 3, into which opening a portion of the length of the shaft 73 extends. The rolls are engaged with the shaft so as to cause them to rotate in unison therewith, by reason of the said opening being angular in cross-section, and the portion of shaft 73 which enters the same being correspondingly angular in cross-section. The shaft 73 is supported, partly by the rolls 75, 75, and partly by an independent bearing 74. For the purpose of transferring portions of ink from the said rolls 75, 75, to the inking rolls 51, 51, each fountain has combined therewith a transfer-roll 76 mounted in a carrier 77 pivoted to the fountain at 27ª, 27ª, Fig. 2, so that such roll 76 rests normally in contact with the corresponding roll 75 at the side of the latter next adjacent the inking-plate. Roll 75 as it rotates carries ink upon its surface, and roll 76 becomes charged therewith. When in its normal position, the roll 76 extends partly into the path described by the inking-rolls which supply ink to the corresponding printing-plate.

In the operation of the machine, as each pair of inking rollers 51, 51, carried around by an ink-roll carrier in its rotation, passes from beneath the printing-plates and upward at the outer side of the ink-plate, such rollers touch the rollers 76, 76, pertaining to the adjacent ink-fountains, thereby receiving ink from such rollers 76, 76. The rollers 51, 51, press the rollers 76, 76, upward until the latter are passed, whereupon rollers 76, 76, drop into contact with the rolls 75, 75, again. Each transfer-roll 76 is removably mounted in its carrier 77, so that it may be removed from the latter for the purpose of being cleaned, and afterward replaced. Thus, the said roll is mounted upon short journals projecting from the side-pieces or arms of the carrier and entering a central bore of the roll, or central holes in the ends of the latter. The said side-pieces or arms are capable of movement toward and from each other, and have combined with them a contracting spiral spring 77ª connecting them together, and by which they are drawn toward each other so as to retain the projecting journals carried thereby within the central bore or holes of the roll. The spring yields to permit the side-pieces or arms to be moved apart by the operator to provide for the removal of the roll, or its subsequent replacement, and when again permitted to contract draws the side-pieces or arms nearer together again so as to engage with the roll again when it is replaced between them.

For the purpose of rotating the rolls 75, 75, each shaft 73 has fixed thereon a spur-gear 78, (Figs. 1, 2, 3) and with such spur-gear meshes a pinion 79, Fig. 1, fixed upon a shaft 80 mounted in bearings upon the machine-frame below the shaft 73. Through the said spur-gears the shaft 73 and its rolls 75, 75, are rotated when the shaft 80 is caused to turn. The two shafts 80, 80, at the opposite sides of the machine constitute part of the feed-mechanisms for the metal strips of which the extractor-attachments are formed, and are utilized for the purpose of transmitting movement to shaft 73 to turn the latter and the rolls 75, 75. The turning of the said shafts 80, 80, is effected by means of intermittent-clutch devices and actuating means therefor, comprising clutch-hubs or wheels 81, 81, Figs. 1, 2, 3, fixed upon the respective shafts, a clutch-arm 82 in connection with each of the said clutch-hubs or wheels, a link 83, Figs. 2 and 3, joining the two clutch-arms 82, 82, to each other, and a link 84, Figs. 1, 2, 3, having one end thereof connected to a pivot 84$^a$ carried by one of the said clutch-arms and the other end thereof connected pivotally to a projecting part of the lever 34, to which reference has been made, actuated by cam 37 on cam-shaft 14. Mainly for the purpose of regulating the rate of the feed of the metal strips, the pivot 84$^a$ is adjustable along a slot 84$^b$ in the clutch-arm 82, toward and from the axis of shaft 80, and has combined therewith an adjusting-screw 84$^c$.

The punch 6 is carried by the head 50, and as shown in Fig. 4 is mounted thereon at a distance from the adjacent printing-plate corresponding to the extent of a feed-movement of the cap-stock. The die 7, which coöperates with punch 6 as aforesaid, is contained in a socket in a die-holder 7$^a$, Fig. 5, and the said die-holder is mounted upon the top-portion 13$^a$ of the machine-frame in proper position for coöperation with the punch. By the feed-movement of the cap-stock, it occurring while the head 50 is raised, the imprinted portion of the cap-stock is carried from its position below the adjacent printing-plate 5 into position between the punch and die, and on the next descent of head 50 such portion is punched cut from the strip of cap-stock. The same descent of the head carries the printing-plate or printing-plates into contact with the portion of the strip of cap-stock which rests upon the printing-bed 4, so that at every stroke an imprint or imprints are made for the next succeeding cap or caps. The punch works through a stripper 85 mounted above the path of the strip of cap-stock, so that as the punch rises from the die the said stripper shall hold down the scrap-portion of the strip, while the punch is pulled out of the hole from which a disk or cap has been punched. The waste is guided out through an opening 44$^c$ in the adjacent slide 44, as shown in Fig. 4. The stem 6$^a$ of the punch occupies the central bore of a sleeve 86, which latter in turn occupies a hole made vertically through the head 50. A flange upon the upper end of the sleeve rests upon the top of the head 50, and supports the sleeve in position within the said hole. The sleeve is split from end to end along one side thereof, to enable it to be caused to contract upon the stem of the punch, so as to grasp the said stem to prevent the punch from dropping. The sleeve is thus contracted by means of clamp-screws 87, 87, Figs. 1, 3, 5, screwing into threaded holes that are tapped in the head 50, and acting at their inner ends against the exterior of the sleeve. By the engagement of the said inner ends in depressions, Fig. 5, in the said exterior, the sleeve is held from vertical displacement resulting from the resistance offered by the cap-stock to the punching operation. The shoulder at the upper end of the working portion of the punch makes firm contact with the lower end of the sleeve, (see Fig. 4) so that the punch cannot slip upward within the sleeve.

The acting end of the punch is peculiarly formed, as explained later herein, one portion thereof being designed to drive the disk or cap which has just been punched out down upon the burs of an extractor-attachment, and clench such burs in the material of the disk. In order to insure that in placing the punch in the machine this portion of the punch shall be disposed properly to perform the functions required of it, and also to hold the punch from turning so as to throw such portion out of register, the stem 6$^a$ of the punch is provided with a pin 88, Fig. 4, which projects radially therefrom through the slit of the sleeve 86 and into a vertical groove 89, Figs. 3 and 4, formed in the wall of the hole through the head 50 in which the sleeve is contained.

In order that the lower end of the punch may not become charged with ink from the freshly-imprinted surface of the portion of cap-stock which it punches out in forming a disk or cap, the said end is hollowed out as shown in Fig. 6, leaving merely a shell or rim 6$^b$ around the greater part of its periphery, except where the frog-like portion 6$^c$ extends radially inward toward the center of the punch.

The punch 6 performs the second and very important function of operating to attach an extractor-device or attachment to the disk or cap which it has just cut from the strip of cap-stock. To this end, the punch is arranged to coöperate with an anvil 90, Figs. 4, 5 and 7 to 11. This anvil is disposed in line with the punch, below the opening through the die, so that the disk or cap punched from the strip of cap-stock is received upon the strip of metal of which an extractor-device or attachment is presently to be formed, which strip has been inserted above the top surface of the anvil. The leading portion of the strip, formed with the burs $b^2$, $b^2$, Fig. 15, is fed or inserted into position over the anvil while the punch is elevated, with the burs overlying the acting portion 91$^a$, Fig. 8, of the anvil, and the ends of the burs turned upward. The frog-like portion $6^c$ of the descending punch forces the disk or cap upon the burs, causing the latter to penetrate the material of the disk or cap, and then clenches the burs in the said material. The anvil is formed with raised portions forming a rim, 91, providing a pocket for the disk or cap, the said rim having at the outer side of the anvil a small opening $91^b$, Figs. 7 and 8, to permit the metal strip to be pushed into the pocket into position beneath the opening of the die, so that the disk or cap when punched out and carried down by the punch shall land upon the burs of the extractor-device or attachment. A second opening, $91^c$, Figs. 8, 9, 10, at the front of the anvil, registers with the groove $91^d$ made through the anvil from front to rear for the reception of the transferrer or pusher presently to be described. An opening of the full diameter of the cap at the rear of the anvil, see Figs. 8 and 9, permits the cap to be pushed rearward from the anvil by the said transferrer or pusher. At $91^e$ is shown a hold-down flange to prevent the cap from rising as it is pushed rearward. The cap passes beneath this flange as it moves out from the pocket of the anvil. To enable disks or caps of varying thicknesses to be operated upon with uniformity of results, and to avoid any straining or breakage of parts when a disk or cap of undue thickness is operated upon, and in case two or more caps should intervene at one time between the punch and the anvil, I employ a yielding construction which will accommodate itself to the thickness of material between punch and anvil as the former closes toward the latter. In this yielding construction one of the said parts is backed up by a spring. Herein it is the anvil which is thus backed up and thereby yieldingly held up to its work. As shown in Figs. 4 and 5, etc., a boss on the under side of the anvil enters a socket in the upper end of a fixed guide 92. This boss has formed as a continuation therewith a stem 93 occupying a vertical hole through the said guide. Or the stem may be a separate piece, with the boss engaging with its upper end. The lower end of the stem rests upon a block 94 occupying the upper portion of a socket in a socket-piece 95 attached to the machine-frame. The block 94, in turn, rests upon and is supported by a spiral spring 96 within the socket and supported by the bottom of the latter. The spring gives the desired capacity for yielding, although it is sufficiently stiff to hold the anvil up to its work normally, without giving way.

The strip of which an extractor-attachment is formed is fed, by preference, automatically into position above the anvil, as in the illustrated construction of the machine, although the invention is not restricted to feeding the said strip by mechanical means on the order of that shown, and certain features of the invention may be employed in a machine in which the strip or the attachment itself is fed by hand. In this instance, the machine is constructed to form and feed the attachment. A continuous strip $b^5$ of metal is employed. This strip extends within a guide 96 to and between a pair of feed-rolls 97, 98, Fig. 5. The feed-roll 97 is fixed upon the shaft 80, and by the intermittent rotation of the latter, occasioned by the means which has been described, is actuated to feed the said strip $b^5$ forward a distance corresponding with the length required for an extractor-attachment. Roll 98 is a presser-roll, which holds the strip in firm contact with roll 97. The roll 98 is journaled upon an arm 99 having a pivot 100 mounted in a bearing in connection with the guide 96, so that the roll 98 may move toward and from the roll 97, and the said arm is acted upon by an expanding spiral spring 101 by which it and roll 98 are pressed with yielding force toward the roll 97. The spring 101 is threaded upon a stud 102 extending from the fixed guide 96 and passing loosely through a hole in arm 99, the said spring being compressed between the arm and the projecting flange of the head of the stud. The feed-rolls 97 and 98 are geared to each other so that they shall have the same surface speed, by means of spur-gears $97^a$, $98^a$.

The hole $b^4$, Figs. 13 and 15, Sheet 1, in the extractor-attachment is made therein by means of a punch 103 and die 104, Fig. 5. In this instance these are arranged to act upon strip $b^5$ after it has passed the feed-rolls 97 and 98, although it is not material whether the hole $b^4$ is punched subsequently to passing between such feed-rolls or in advance thereof. Punch 103 is shown as having a pivotal connection at 105 with an arm 106 that is pivoted at 107 to a fixed bracket 108. By the action of a contracting spiral spring 109 the said arm normally is held raised into a position determined by a fixed stop 110, with the working end of the punch clear of strip $b^5$. The punch is caused to act to form the hole $b^4$, by means of a striker 111 which is attached to the adjacent head 50, and which in the descent of the head strikes the said arm 106 and operates the same and the punch to form the hole $b^4$. The punch is raised by the action of spring 109 as the head rises. The portions of metal which are punched out from the strip $b^5$ by the conjoint action of the punch 103 and die 104, pass down through the said die and discharge through a guideway $104^a$.

The burs $b^2$, $b^2$, are formed in the metal strip by means of punches 112, 112, coacting with a die 113 having a hole for each such punch. The punches 112, 112, project upwardly from the upper end of a slide 114 mounted in guide-ways in connection with the machine-frame. The said slide is operated to actuate the punches 112, 112, by operating connections comprising a link 115 connecting at its upper end with the slide, and a rocker 116, Figs. 1 and 6, pivotally mounted upon brackets 36, and having one arm 117 thereof pivotally connected to the lower end of said link and another arm, 118, provided with a roll mounted upon a pin, 119, and working in the lower cam-groove, 120, of the cam 37 upon cam-shaft 14. The same rocker is operatively combined with the slides 114, 114, at the opposite sides of the machine, it having two similar arms 117. The rise of the slide 114 causes the punches 112, 112, to penetrate the metal strip. The working ends of such punches are shaped to split and displace upwardly the portions of the metal with which they engage, turning the displaced metal up in the form of burs.

In operation, it being assumed that the punches 112, 112, have been caused to pass upward through the leading portion of the metal strip to form the burs $b^2$, $b^2$, Fig. 15, and that the punch 103 has been caused to pass downward through the strip to form the hole $b^4$, (see Fig. 5) and that the said punches are withdrawn from the metal strip and punch 6 is in an elevated position, a feed-movement of the feed-rolls 97, 98, takes place and thereby the said leading portion, with its upturned burs, is advanced into a position above the anvil 90. The extent of the feed-movement is such as to cause the end of the strip to extend across the anvil 90 to a distance inward from the edge of said anvil corresponding with the length of the lower limb of an extractor-attachment. The punch 6 descends, and through its coaction with die 7 cuts an imprinted disk or cap from the strip of cap-stock, and by its continued descent forces such disk or cap down through the die and its support, driving it upon the burs of the attachment and clenching the burs in the material of the disk or cap. The punches 112, 112, and 103, are caused to act to produce the burs and hole for the next extractor-attachment, and the first extractor-attachment is severed from the continuous metal strip by means of a movable cutter 121. The said movable cutter is carried by the slide 114, and cooperates with a stationary cutter that is constituted by the inner end of the die 113. The strip is cut at a distance from the outer edge of the anvil corresponding with the desired length of the upper limb of the extractor-attachment. The cutter 121 in rising also acts by its heel-portion, which works close alongside the exteriors of the anvil 90 and punch 6, to turn upward that portion of the attachment that extends outward from the said anvil and punch. In thus acting it bends the said portion up against the exterior of the punch 6, which is flattened at $6^x$, Fig. 6, for the strip to lie against the same. This is illustrated in Fig. 5. On the rise of the punch 6 and descent of the combined cutter and bender 121, the said upturned portion is bent around the edge of the disk or cap resting upon the anvil, and pressed down flatly upon the upper surface of the disk or cap, by means of a bending tool 123, omitted from Fig. 5 at the left but shown at the right in Fig. 5. This tool is fixed to one arm of a lever 124, which latter is pivoted upon the machine-frame at 125. The tool is actuated through connections between lever 124 and slide 114, such connections comprising a block 126 pivotally mounted upon a stud projecting from slide 114 and held thereon by means of a washer 127 and screw $127^a$, the said block working in a slot 128 in the other arm of the said lever. Through the said connections, movement is transmitted to the lever and tool as the slide ascends and descends. They are swung inward as the slide descends, and by the inward movement of the tool it is caused to act upon the upturned portion of the extractor-attachment. The tool is formed with a beveled acting end, the point of which strikes first against the upstanding portion of the piece of strip that has been riveted to the disk or cap, and bends such portion around the edge of the disk or cap and then down upon the upper surface of the disk or cap. In this bending operation the pressure of the point of the tool against the upper extremity of the said upstanding portion of the metal strip bends the upstanding portion forward into curved form so that the tip thereof arrives first in contact with the upper surface of the disk or cap. The inclined portion of the acting end of the tool gradually assumes a position parallel with the said upper surface and thus makes contact with the convexed back of the upper limb of the extractor-attachment, the continued pressure operating to press the said limb down flat and close to such surface, thereby completing the work of applying the extractor-attachment to the disk or cap. By so conducting the bending operation as to curve the upper limb in the manner described before it is flattened down upon the upper surface of the disk or cap, such limb will lie snugly and flatly against the said surface, as in Fig. 15, upon the completion of the bending-over and flattening operation. This is of great importance practically, inasmuch as such limb cannot pass over the edge of another cap, or engage with the corresponding limb of the extractor-attachment of the latter. This enables the caps to be stored and shipped loosely in bulk, without danger of two or more caps becoming caught together. It also facilitates the use of the caps in capping machines, because the attachments lie so snugly and closely to the surfaces of the caps that there is no projection from such surfaces to cause trouble through engagement with gages and other parts in such machines. The upper limb of the attachment is formed with a more or less rounded or pointed free extremity to facilitate lifting the same, and avoid short corners such as would cause injury to a person's finger beneath his finger-nail if the latter were employed in lifting such limb. The free extremity of the under limb is usually left with the shape resulting from cutting out the said rounded or pointed free extremity, namely with the two points $b^6$, $b^6$, Figs. 14 and 15. These points are bent inward toward the disks, as indicated in the said figures, to obviate possibility of their catching upon anything. This bending inward of the said points is effected by means of small projections $91^g$, $91^g$, upon the portion $91^a$ of the anvil, such portion being formed as a separate piece for convenience in replacement in case the said projections should become worn.

When the bending tool is raised and retracted, the disk or cap is pushed away from the anvil, to make room for the leading portion of the metal strip $b^5$ when the latter is next fed forward, and for the descent of the succeeding disk or cap. It is thus pushed away by means of the pusher or transferrer 8 (Fig. 4). The pusher or transferrer is supported by the portion $13^a$ of the machine-frame, and slides thereon in suitable guides which confine it to movement lengthwise. It is actuated by means of a link 129, Figs. 1, 3 and 4, which is connected pivotally at the inner end thereof with the pusher or transferrer, and a lever 130, Figs. 1, 2, 3, to which the outer end of such link is connected pivotally, said lever being mounted pivotally upon the machine-frame at 131 and connected by means of a link 132 to a crank 133 upon one end of the main shaft 11. In the rotation of the main shaft movement is transmitted from the said crank to the pusher or transferrer, and the latter is thereby reciprocated lengthwise. The acting end of the pusher or transferrer works through a slot or depression $91^d$ in the anvil, so that the punch 6 may descend while the pusher or transferrer is extended through said slot into an advanced position, and so that movement of the pusher or transferrer may take place while the said punch is in its lowest position. To enable the pusher or transferrer to engage with a disk or cap for the purpose of moving the same from its position in connection with the anvil, the pusher or transferrer is furnished with a dog 134 which is pivoted thereto as shown in Fig. 4. One portion of this dog is adapted to project up above the head-portion of the pusher or transferrer high enough to engage with the edge of a disk or cap resting upon the anvil. Such engagement takes place at the beginning of the transferring movement of the pusher or tranferrer, so that the pusher or transferrer takes the disk or cap with it, away from the anvil. As the disk or cap leaves the anvil, it enters fixed guides 135, along which it is caused to move by the action of the pusher or transferrer. In order that in the return movement of the pusher or transferrer its dog may pass under the disk or cap that is supported by the anvil, without interfering with or displacing such disk or cap, the dog 134 is tilted, so as to depress its acting portion, at the close of the feeding stroke of the pusher or transferrer. This is accomplished by reason of the depending tail of the dog striking against a stop at 136. At the end of the retracting stroke toward the front end of the machine, after the dog has passed under the disk or cap now resting upon the anvil, and beyond the said disk or cap, the acting portion of the dog is raised again through contact of the said tail with a stop-piece 137, which is backed-up by an expanding spiral spring 138 and thereby made yielding. Consequently, when next the pusher or transferrer is advanced for a feeding or transferring stroke the said acting portion engages with the disk or cap and pushes it from the anvil and along the guides 135.

The disk or cap may discharge from the machine as it is moved along by the pusher or transferrer, but preferably it is first presented to the action of devices by which it is treated with paraffin, or otherwise. The two paraffining rolls 9, 10, which have been mentioned already are so disposed that the disk or cap pushed along the guides 135 by the action of the pusher or transferrer enters between such rolls. By the revolution of the rolls 9 and 10 the disk or cap is caused to pass between them, and the rolls apply to the disk or cap the paraffin in a heated and melted state with which they are charged. The rolls 9, 10, are journaled in bearings in connection with a casing 136, which almost completely covers and incloses the said rolls to prevent escape of heat, and also prevent loss of paraffin by the passing off of the vapor thereof. The two rolls are geared together by means of spur-gears 137, 137 to cause them to rotate in unison, and are actuated by means of a helical gear 138, Fig. 3, fixed upon the shaft of the lower roll, a like gear 139, Figs. 1 and 3, meshing with the gear 138, an upright shaft 140 on which said gear 139 is fixed, and bevel gears 141, 142, by which the shaft 140 is driven from the main shaft 11. The rolls 9, 10 have coverings of felt, cloth, or the like absorbent material to carry the melted paraffin or other substance with which the disks or caps are treated. The paraffin or other substance is contained in a reservoir 143, Fig. 4, the open top of which is presented to the open bottom of the casing 136. The top of the reservoir is pressed against the bottom of the casing by means of a supporting and clamping screw 144, and thereby the reservoir is held securely in place. Suitable provisions are made in practice for heating the reservoir and its contents. Gas burners usually are employed. To feed the paraffin or other substance contained in the reservoir to the rolls 9, 10, a roll 145 is provided, the greater portion of which is contained within the reservoir, and a sufficient supply of the paraffin or other substance is maintained in the reservoir to partly submerge the said roll. The periphery of roll 145 makes contact with lower roll 10, and keeps the latter charged, and roll 9 becomes charged through contact with roll 10.

To enable the axis of supply-roll 145 to be adjusted toward or from that of roll 9, so as to compensate from time to time for variations in the diameter of roll 10, the bearings of supply-roll 145 are combined with levers 146 pivoted in connection with reservoir 143, said levers being engaged by projections on the lower ends of screw-threaded rods 147. The latter pass upward through holes in lugs 148 projecting inward from the reservoir 143, and above said lugs receive upon their threaded stems nuts 149 that rest upon the lugs. Adjustment of said nuts 149 will regulate the amount of paraffin or other substance supplied to rolls 9, 10.

To prevent paraffin from escaping from the casing of the paraffining devices at the side next to the cap-making devices, and getting upon the transferrer, upper and lower plates 150, 150, are applied in connection with the opening in said casing which is in line with the entrance between rolls 9 and 10. The free edges of the said plates normally touch each other adjacent the said entrance. The plates are of spring material, permitting a cap to be pushed between them by the action of the pusher or transferrer, the plates separating as the cap is moved forward and closing against each other as soon as the cap has passed beyond their free edges.

The disk formed by the coaction of the punch and die descends directly into the pocket of the anvil, printed side uppermost. As it leaves the said pocket, passing under the flange 91ᵉ thereof, it enters the guideway leading to the paraffining rolls, and is controlled by the said guideways until it is taken hold of between such rolls. It issues, face upward, from the rolls. It will be perceived that the cap and the stock of which the same is formed are under continuous control from the time that the stock enters the machine until the completed cap leaves the paraffining rolls, and all the caps are delivered from such rolls with the same side uppermost.

I claim as my invention:

1. In combination, an anvil and coacting presser-member adapted to receive a closure between them, means for presenting between said parts the attaching portion of an extractor attachment, means for causing relative approach of said parts and thereby forcing a projection or projections of said attaching portion into the closure at one side of the latter, and means for bending the extractor attachment around the edge of the closure to form a handle at the other side of the closure.

2. In a machine for making closure-disks, etc., the combination with stock-feeding, article-forming, printing and attachment-applying devices, of means for paraffining or otherwise treating the article, and means for delivering the latter from the said devices to the said means such delivering means positively controlling the article during transfer.

3. A machine for making closure-disks, etc., comprising devices for applying an extractor-attachment to a disk, and means for paraffining or otherwise treating the article, and maintaining continuous control of the article until after discharge from the said means.

4. In a machine for making closure-disks, etc., the combination with stock-feeding devices, of a device which cuts an article from the stock and fastens thereto an attachment by driving portions of the latter into the material of the article.

5. In a machine for making closure-disks, etc., the combination with stock-feeding and printing devices, of a device which cuts an article from the stock and fastens thereto an attachment by driving portions of the latter into the material of the article.

6. In a machine for making closure disks, etc., a punch, a die with which such punch coacts in cutting out the article, and an anvil with which the punch coacts in fastening an attachment to the article.

7. In combination, a punch, a die with which such punch coacts in cutting out the article, an anvil with which the punch coacts in fastening an attachment to the article, and means for presenting the attachment between the punch and anvil in position for being fastened to the article.

8. In combination, a punch, a die with which such punch coacts in cutting out the article, an anvil with which the punch coacts in fastening an attachment to the article, and devices for forming a fastening projection on the leading portion of a continuous strip, feeding such portion between the punch and anvil, and severing the same to form an attachment.

9. In combination, devices for presenting a disk, cap, or other article, applying an attachment to the same and bending it around an edge thereof to lie partly upon the top and partly upon the bottom thereof, and means for paraffining or otherwise treating the article directly receiving the latter from the said devices.

10. In combination, devices for presenting closure stock in position to receive an extractor attachment, devices for forming integral attaching means upon a strip of extractor material, and devices for engaging said attaching means with the closure stock, and severing the extractor from the strip at a distance from the attaching means to provide an extended handle portion for use in extracting the closure.

11. In combination, means for feeding a strip of article stock, devices for forming successive articles therefrom, devices for forming integral attaching means upon a metal strip, devices for engaging said attaching means with the article stock, for each article, and severing the attached metal portions in succession from said strip, and pusher means for discharging the articles from the said devices.

12. A machine for the purpose described comprising devices for presenting closure-stock in position to receive an extractor attachment, and devices for forming an extractor attachment from a continuous length of material, attaching the attachment to the closure at one side of the latter by driving a portion of the former into the latter, and bending the attachment around the edge of the closure to form a free handle at the other side of the closure.

13. A machine for the purpose described comprising stock-feeding means, means for forming a closure or other article therefrom, and devices for feeding a continuous strip, forming an attaching projection thereon; driving such projection into the material of a closure or other article, cutting off from the remainder of the strip the portion thereby connected with the said closure or other article, and bending such portion around the edge of the closure or other article to form a handle.

14. A machine for manufacturing bottle or jar closures with attached extracting means, comprising in combination, means for feeding closure stock, means for printing the said stock, means for forming integral attaching means upon extractor material in continuous strip form, means for intermittingly feeding such strip and its attaching means into position for application, and devices for forming a closure from the said stock and an extractor from the said strip and engaging the extractor with the closure by means of said integral attaching means.

15. A machine for manufacturing bottle or jar closures with attached extracting means, comprising in combination, means for feeding closure stock, means for printing the said stock, means for forming integral attaching means upon extractor material in continuous strip form, means for intermittingly feeding such strip and its attaching means into position for application, devices for forming a closure from the said stock and an extractor from the said strip and engaging the extractor with the closure by means of said integral attachment means, and means for applying waterproofing material to the printed closure with attached extractor, said waterproofing means receiving the same directly from the said devices.

16. In combination, stock-feeding means, and devices for cutting an article from the stock, feeding a continuous length of extractor material, forming an attaching projection thereon, severing the portion provided with such projection, and attaching the said portion to the article by driving the projection into the latter.

17. In combination, stock-feeding means, printing means, and devices for cutting an article from the stock, feeding a continuous length of extractor material, forming an attaching projection thereon, severing the portion provided with such projection, and attaching the said portion to the article by driving the projection into the latter.

18. In combination, means for feeding closure stock, and means for applying an attachment including coacting elements which compress a closure-disk or other article and its attachment between them in combining the latter with the former, one of such elements constructed to indent a point or points of such attachment into the material of the disk or other article.

19. In combination, stock-feeding devices, a reciprocating head, a printing surface carried by the said head, arranged to print upon the stock fed by said devices, inking devices for said surface also carried by the said head, an article-cutting device operated by the movement of the head, and means for fastening an attachment to the article.

20. In combination, stock-feeding devices, a reciprocating head, a printing surface carried by the said head, an inking device for said surface also carried by the said head, a punch operated by the movement of the head, a die with which said punch coöperates in cutting out the articles from the stock, and means for fastening an attachment to each article.

21. In combination, stock-feeding devices, attachment-forming and feeding devices, a reciprocating head, a printing surface carried by the said head, an inking device for said surface also carried by the head, a die, and a punch operated by the movement of the head, coöperating with said die in cutting out an article from the stock and operating to fasten an attachment to the article.

22. In combination, stock-feeding devices, attachment-forming and feeding devices, a reciprocating head, a printing device operated by the said head, a die, a punch operated by the said head, coöperating with the said die in cutting out an article from the stock, an anvil with which the punch coöperates in fastening an attachment to the article, and a bending device by which the attachment is bent around the edge of the article.

23. In combination, stock-feeding devices, attachment-forming and feeding devices, a reciprocating head, a printing device operated by the head, a die, a punch operated by the head, coöperating with the said die in cutting out an article from the stock, an anvil with which the punch coöperates in fastening an attachment to the article, a transferrer, and paraffining devices to which the article is fed by the transferrer.

24. In combination, stock-feeding means, means for forming a closure or other article therefrom and applying an attachment including devices for fastening one portion of an attachment to a surface of a closure or other article with a portion thereof projecting radially beyond the edge of the latter and bending the radially-projecting portion of the attachment at the edge of the closure or other article at an angle to the surfaces of the closure or other article, a bending tool, and means to engage the said tool with the said portion and progressively curve the end of such portion down against the other surface of the closure or other article and then flatten the said portion.

In testimony whereof I affix my signature in presence of two witnesses.

FREDERIC K. PLYMPTON.

Witnesses:
NATHAN B. DAY,
CHAS. F. RANDALL.